(12) United States Patent
Nagashima et al.

(10) Patent No.: US 12,722,707 B2
(45) Date of Patent: Sep. 1, 2026

(54) VEHICLE SKELETON STRUCTURE

(71) Applicant: TOYOTA JIDOSHA KABUSHIKI KAISHA, Toyota (JP)

(72) Inventors: Shinya Nagashima, Kariya (JP); Toshiyuki Dobashi, Nagoya (JP); Nobuyuki Shinohara, Tajimi (JP); Mayumi Takazawa, Okazaki (JP); Reona Takagishi, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 18/544,434

(22) Filed: Dec. 19, 2023

(65) Prior Publication Data

US 2024/0278844 A1 Aug. 22, 2024

(30) Foreign Application Priority Data

Feb. 17, 2023 (JP) ................................ 2023-023755

(51) Int. Cl.
*B62D 21/15* (2006.01)
*B62D 25/08* (2006.01)
*B62D 25/20* (2006.01)
*B62D 27/06* (2006.01)

(52) U.S. Cl.
CPC ......... *B62D 21/157* (2013.01); *B62D 21/152* (2013.01); *B62D 25/08* (2013.01); *B62D 25/2027* (2013.01); *B62D 25/2036* (2013.01); *B62D 27/06* (2013.01)

(58) Field of Classification Search
CPC .... B62D 21/157; B62D 21/152; B62D 25/08; B62D 25/2036; B62D 25/20; B62D 25/02; B62D 25/2063; B62D 25/082; B62D 25/087; B62D 25/2027; B62D 27/06; B60S 5/00
USPC ............ 296/187.12, 187.11, 187.08, 203.03, 296/203.04
See application file for complete search history.

(56) References Cited

U.S. PATENT DOCUMENTS 5,324,133 A 6/1994 Kreis et al.
9,751,565 B2 * 9/2017 Tatsuwaki .............. B62D 21/11
12,503,165 B2 * 12/2025 Rai ...................... B62D 21/152
2001/0033094 A1 * 10/2001 Sano ...................... B62D 21/15
296/203.02
2004/0119321 A1 * 6/2004 Kasuga ..................... F16F 7/12
296/205
2019/0176898 A1 * 6/2019 Nishii .................. B62D 25/085

FOREIGN PATENT DOCUMENTS

JP H06-503782 A 4/1994
JP 3002918 U 10/1994
(Continued)

*Primary Examiner* — Amy R Weisberg
*Assistant Examiner* — Denise Lynne Esquivel
(74) *Attorney, Agent, or Firm* — SOLARIS Intellectual Property Group, PLLC

(57) ABSTRACT

A vehicle skeleton structure, including: a die-cast skeleton body formed integrally and including a floor part configuring a vehicle cabin floor portion and a side member disposed at both sides, in a vehicle width direction, of the floor part and extending in a vehicle front-rear direction; and a severance origin point, the severance origin point being formed at the skeleton body, and the severance origin point configuring a starting point when at least a part of the side member is severed.

4 Claims, 6 Drawing Sheets

(56) References Cited

FOREIGN PATENT DOCUMENTS

| | | | |
|---|---|---|---|
| JP | H08-276820 | A | 10/1996 |
| JP | 2015-171825 | A | 10/2015 |
| WO | 2022/031991 | A1 | 2/2022 |

* cited by examiner

UP
RH
Rr
10
30
34
34
34
32
32
32
32
32
32
16A
16C
16(12)
36
4
4

Rr
UP
34
34
34
34
32
32
32
32
16(12)
10
16B
36
16A

Rr
RH
32
32
32
32
34
34
34
36
16C
30
16(12)
16A
50
52B
52
52A
52
52A
52B

RH
Rr
100
50
52B
102
100A
52
104
52A
16(12)

VEHICLE SKELETON STRUCTURE

CROSS-REFERENCE TO RELATED APPLICATION

This application is based on and claims priority under 35 USC 119 from Japanese Patent Application No. 2023-023755, filed on Feb. 17, 2023, the disclosure of which is incorporated by reference herein.

BACKGROUND

Technical Field

The present disclosure relates to a vehicle skeleton structure.

Related Art

International Publication (WO) No. 2022/031991 discloses a vehicle having a die-cast energy absorbing structure. The energy absorbing structure includes plural ribs arranged in a front-rear direction of the vehicle, and corrugations provided between the ribs.

However, in the vehicle described in WO No. 2022/031991, in cases in which the energy absorbing structure collapses during a collision, it is necessary to replace all of the components formed by die casting.

SUMMARY

An object of the present disclosure is to provide a vehicle skeleton structure that enables easy replacement of a part of a structure formed by die casting.

A vehicle skeleton structure of a first aspect of the present disclosure includes: a die-cast skeleton body formed integrally including a floor part configuring a vehicle cabin floor portion and a side member disposed at both sides, in a vehicle width direction, of the floor part and extending in a vehicle front-rear direction; and a severance origin point formed at the skeleton body and configuring a starting point when at least a part of the side member is severed.

In the vehicle skeleton structure of the first aspect of the present disclosure, the die-cast skeleton body is integrally formed including the floor part and the side member. Moreover, the skeleton body is formed with a severance origin point, and this severance origin point serves as a starting point when at least a part of the side member is severed. As a result, in cases in which a part of the side member is damaged owing to a light collision of the vehicle or the like, it is possible to sever the side member with the severance origin point as a starting point, and the side member can be easily exchanged.

A vehicle skeleton structure of a second aspect of the present disclosure is the first aspect, in which the side member is provided with an energy absorbing part configured to absorb energy by collapsing at a time of a vehicle collision, and the severance origin point is formed between the energy absorbing part and the floor part.

In the vehicle skeleton structure of the second aspect of the present disclosure, at least a part of the collision load is absorbed by the energy absorbing part collapsing during a collision of the vehicle. Moreover, if the side member is severed with the severance origin point as a starting point, the collapsed energy absorbing part can be easily replaced.

A vehicle skeleton structure of a third aspect of the present disclosure is the second aspect, in which a flange part extending from the side member toward an outer side in an axial direction is provided in a vicinity of the severance origin point.

In the vehicle skeleton structure of the third aspect of the present disclosure, when replacing a side member, the new side member can be fixed to the skeleton body simply by joining flange parts together.

A vehicle skeleton structure of a fourth aspect of the present disclosure is the third aspect, in which an attachment hole, configured for a bolt to be inserted therethrough, is formed at the flange part.

In the vehicle skeleton structure of the fourth aspect of the present disclosure, by inserting a bolt through the insertion hole in a state in which the flange parts are joined together, the new side member can be mechanically fixed to the skeleton body. This eliminates the need for work such as welding.

A vehicle skeleton structure of a fifth aspect of the present disclosure is the first aspect, in which the floor part configures a floor portion of a rear part of the vehicle cabin, and the side member comprises a rear side member extending from the floor part toward a rear side of the vehicle.

In the vehicle skeleton structure of the fifth aspect of the present disclosure, in cases in which a part of the rear side member is damaged during, in particular, a rear collision of the vehicle, the rear side member can be severed with the severance origin point as a starting point, and the rear side member can be easily replaced.

As described above, according to the vehicle skeleton structure according to the present disclosure, a part of a structure formed by die casting can be easily replaced.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
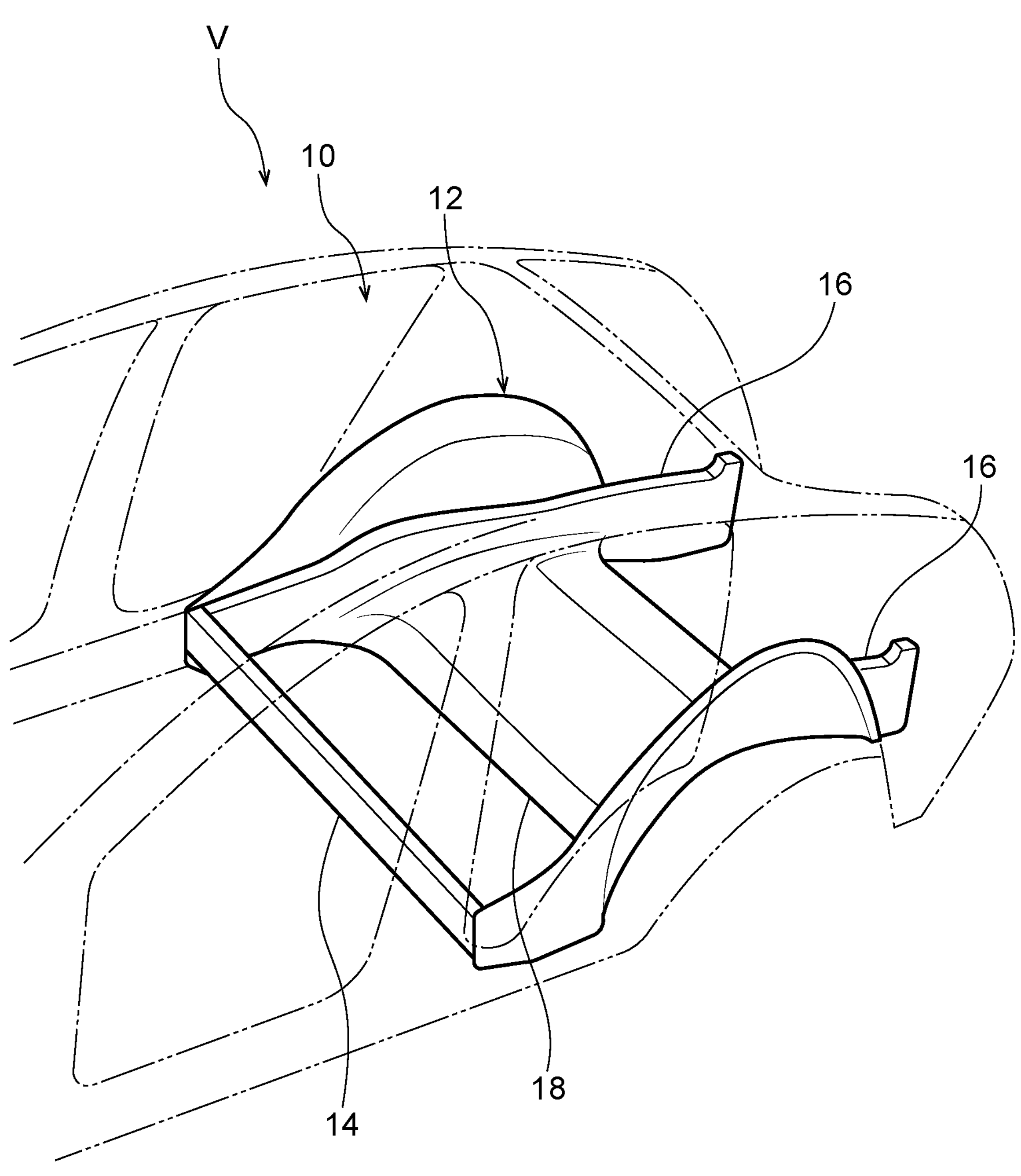
FIG. 1 is a perspective view illustrating a main part of a vehicle to which a vehicle skeleton structure according to a first exemplary embodiment is applied.

Explanation follows regarding a vehicle skeleton structure 10 according to a first exemplary embodiment, with reference to the drawings. Note that the arrow UP, the arrow Rr, and the arrow RH illustrated as appropriate in the drawings respectively indicate an upward direction in a vehicle vertical direction, a rearward direction in a vehicle front-rear direction, and a rightward direction facing a travel direction. In the case of explanation using only the forward/rearward, upward/downward, and left/right directions, unless otherwise specified, these indicate front and rear in the vehicle front-rear direction, upward and downward the vehicle vertical direction, and left and right in a vehicle width direction.

FIG. 1 is a perspective view illustrating a main part of a vehicle V to which a vehicle skeleton structure 10 according to the present exemplary embodiment is applied. As illustrated in FIG. 1, a vehicle skeleton structure 10 of the present exemplary embodiment is disposed at a rear part of a vehicle V, and includes a die-cast skeleton body 12.

The skeleton body 12 is configured including a floor part 14 configuring a floor portion of a rear part of the vehicle cabin, and a rear side member 16 extending toward the vehicle rear from the floor part 14. Moreover, in the skeleton body 12 of the present exemplary embodiment, the floor part 14 and the rear side member 16 are integrally formed by die casting.

Figure 2:
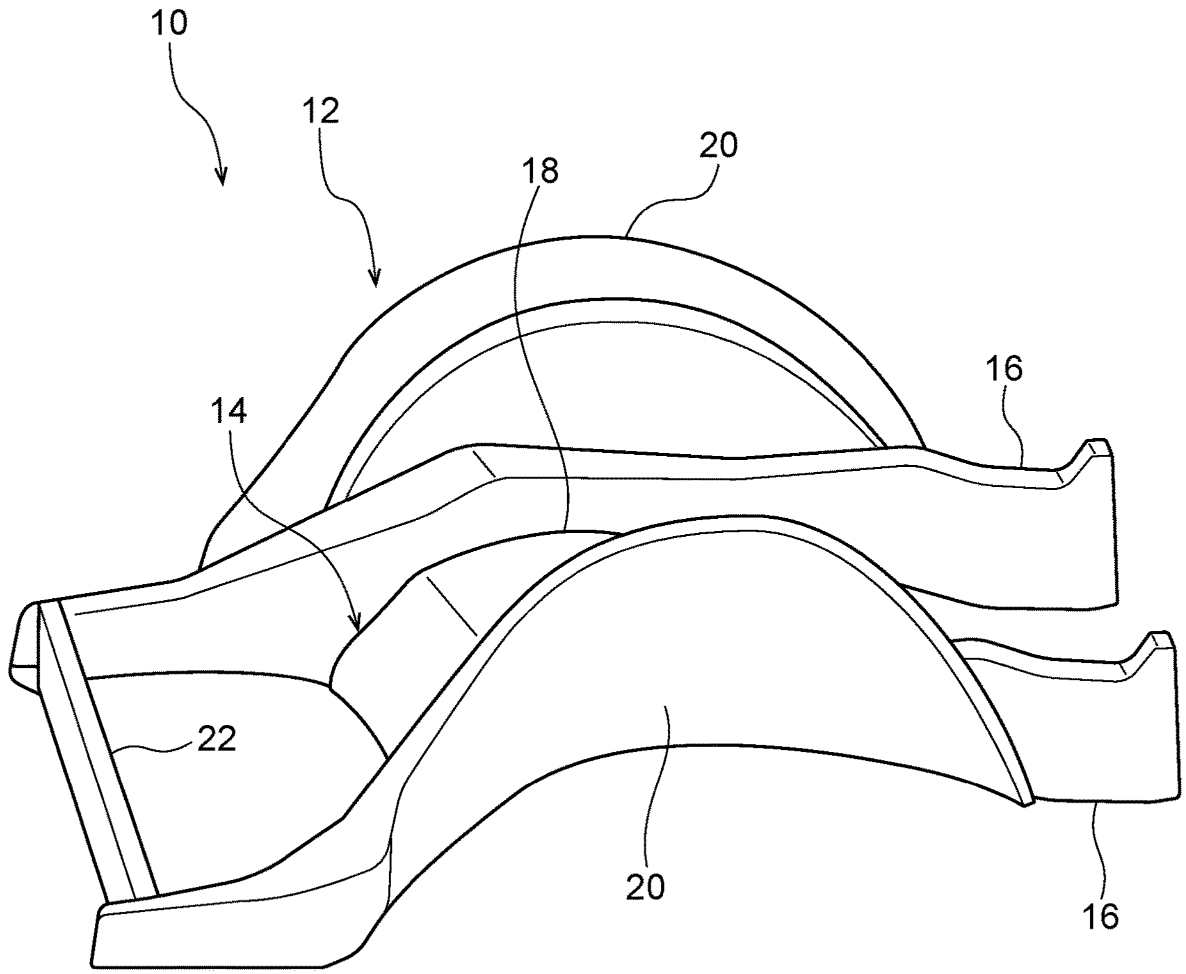
FIG. 2 is a perspective view illustrating a vehicle skeleton structure according to a first exemplary embodiment.

FIG. 2 is a perspective view illustrating a vehicle skeleton structure according to the present exemplary embodiment. As illustrated in FIG. 2, the floor part 14 includes a floor base 18 that extends in a vehicle front-rear direction and a vehicle width direction. A wheel house 20 is provided at both left and right end parts of the floor base 18.

The rear side member 16 is provided as a left and right pair, each extending in a front-rear direction from a front end to a rear end of the skeleton body 12. The front end parts of the rear side member 16 are connected by a connecting part 22 extending in the vehicle width direction. Accordingly, a front part of the skeleton body 12 is formed in a substantial frame shape by the floor base 18, the rear side members 16, and the connecting part 22.

A non-illustrated bumper reinforcement is attached to the rear end parts of the rear side members 16.

Figure 3:
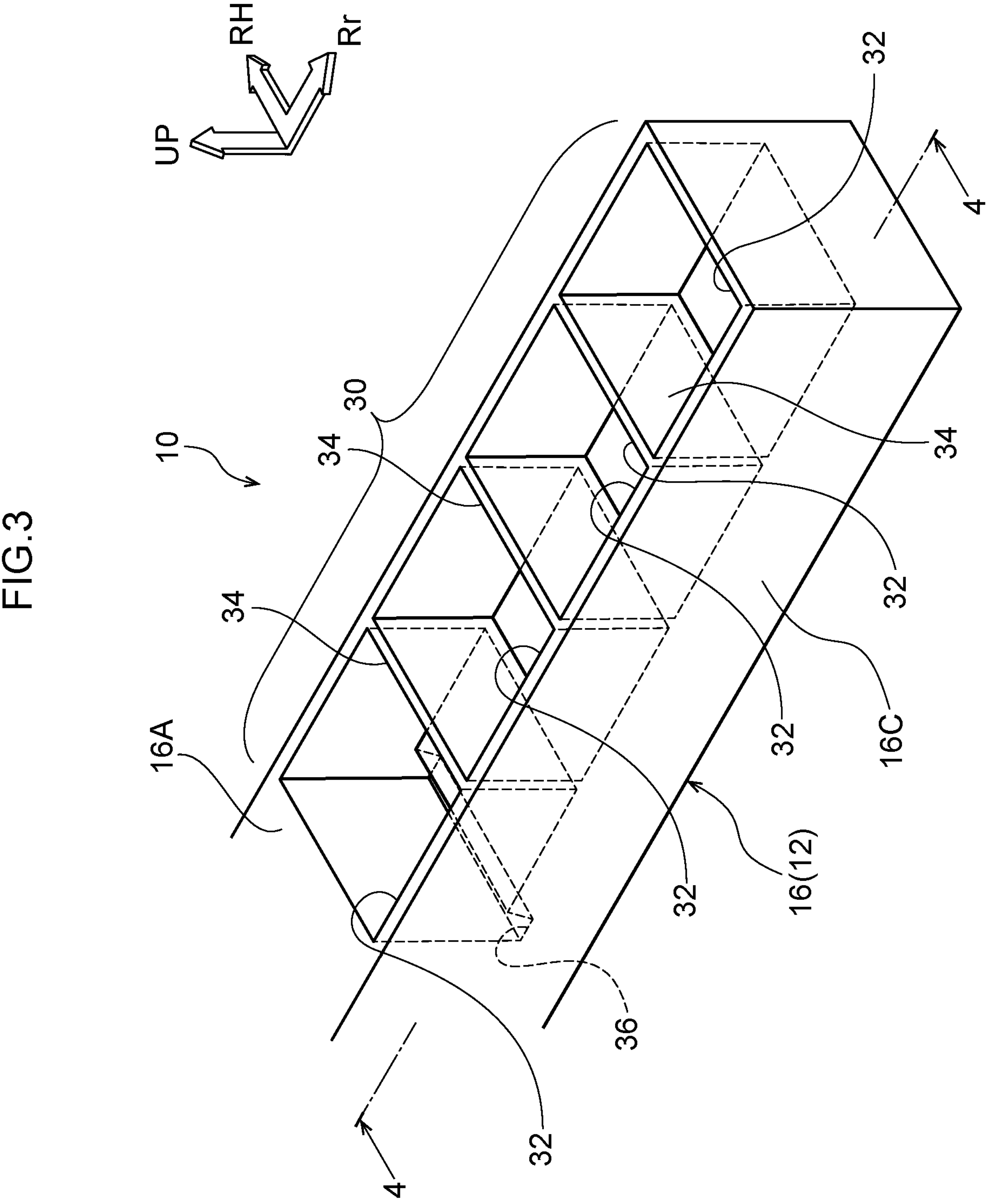
FIG. 3 is an enlarged perspective view of a main part illustrating an enlarged view of a main part of a rear side member in a first exemplary embodiment.
Figure 4:
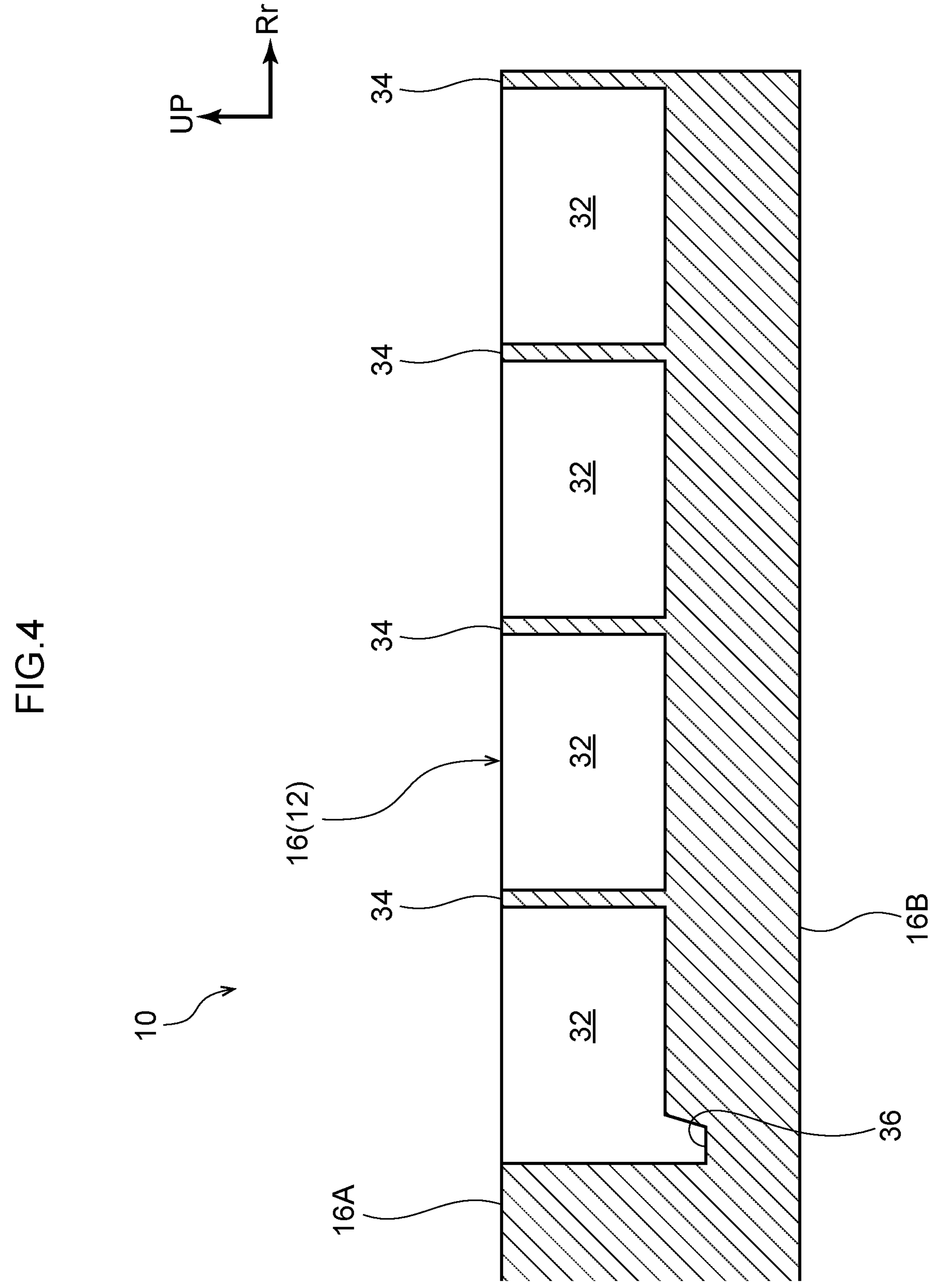
FIG. 4 is an enlarged cross-sectional view of a main part in a state cut along line 4-4 of FIG. 3.

FIG. 3 is an enlarged perspective view of a main part illustrating an enlarged view of a main part of the rear side member 16 in the present exemplary embodiment. FIG. 4 is an enlarged cross-sectional view of a main part, illustrating a state cut along the line 4-4 in FIG. 3. As illustrated in FIG. 3, the rear side member 16 is configured including an upper wall 16A situated at a vehicle upper side, a lower wall 16B (see FIG. 4) situated at a vehicle lower side, and a pair of right and left side walls 16C connecting the upper wall 16A and the lower wall 16B. Note that FIG. 3 illustrates only the side wall 16C at the left side (the inner side in the vehicle width direction) of the pair of side walls 16C, and although the side wall at the right side (the outer side in the vehicle width direction) is hidden from view, the configuration is similar to that of the side wall 16C on the left side.

The rear side member 16 is provided with the energy absorbing part 30. The energy absorbing part 30 is a structure that absorbs energy by collapsing during a collision of the vehicle V, and in the present exemplary embodiment, as an example, the energy absorbing part 30 is configured by the plural concave parts 32 and the plural ribs 34.

The plural concave parts 32 are formed in the upper wall 16A of the rear side member 16, and the height of the rear side member 16 in the vertical direction is low at the part where the concave part 32 is formed, being in a so-called thin-bodied state. Plural concave parts 32 are formed in the vehicle front-rear direction, and adjacent concave parts 32 are separated from each other by ribs 34.

The rib 34 extends vertically from the height of the upper wall 16A of the rear side member 16 to the bottom of the concave part 32. As a result, when a collision load is input to the rear side of the vehicle 16 during a rear collision of the vehicle, since the energy absorbing part 30 at the leading end side of the rear side member 16 has a lower strength than the base end side, at least a part of the collision load is absorbed by the collapse.

As illustrated in FIG. 3 and FIG. 4, a cut-out part 36 serving as a severance origin point is formed in the bottom surface of the concave part 32 configuring the energy absorbing part 30 closest to the base end. The cut-out part 36 is formed in a shape cut downward from the bottom of the concave part 32 so as to act as a starting point for when at least a part of the rear side member 16 is severed. Accordingly, the thickness of the rear side member 16 is locally reduced at the position of the cut-out part 36, enabling the rear side member 16 to be easily severed at the position of the cut-out part 36.

Moreover, since the cut-out part 36 of the present exemplary embodiment is formed between the energy absorbing part 30 and the floor part 14, when the rear side member 16 is severed from the cut-out part 36 as a starting point, the entire energy absorbing part 30 is removed from the rear side member 16.

(Mechanism)

Next, explanation follows regarding the mechanism of the present exemplary embodiment.

In the vehicle skeleton structure 10 according to the present exemplary embodiment, an energy absorbing part 30 is formed at a leading end side of the rear side member 16 of the die-cast skeleton body 12 integrally formed including the floor part 14 and the rear side member 16. Accordingly, when a collision load is input to the rear side member 16 during a collision of the vehicle V, the energy absorbing part 30 collapses and absorbs energy.

Moreover, in the present exemplary embodiment, the cut-out part 36 is formed in the skeleton body 12 as the severance origin point, and the cut-out part 36 serves as a starting point when at least a part of the rear side member 16 is severed. In cases in which a part of the rear side member 16 has been damaged owing to a light collision of the vehicle V or the like, the rear side member 16 can be severed from the cut-out part 36 as a starting point, and the rear side member 16 can be easily replaced.

Moreover, if the rear side member 16 is severed from the cut-out part 36 as a starting point, the collapsed energy absorbing part 30 can be easily replaced.

Note that various methods may be adopted as a method of replacing the collapsed energy absorbing part 30. For example, a replacement rear side member may be joined by welding or the like in a state in which the replacement rear side member is abutted against the skeleton body 12. Alternatively, attachment holes may be formed in advance in the skeleton body 12, and the replacement rear side member and the skeleton body 12 may be mechanically fastened together by bolts or the like.

Second Exemplary Embodiment

Figure 5:
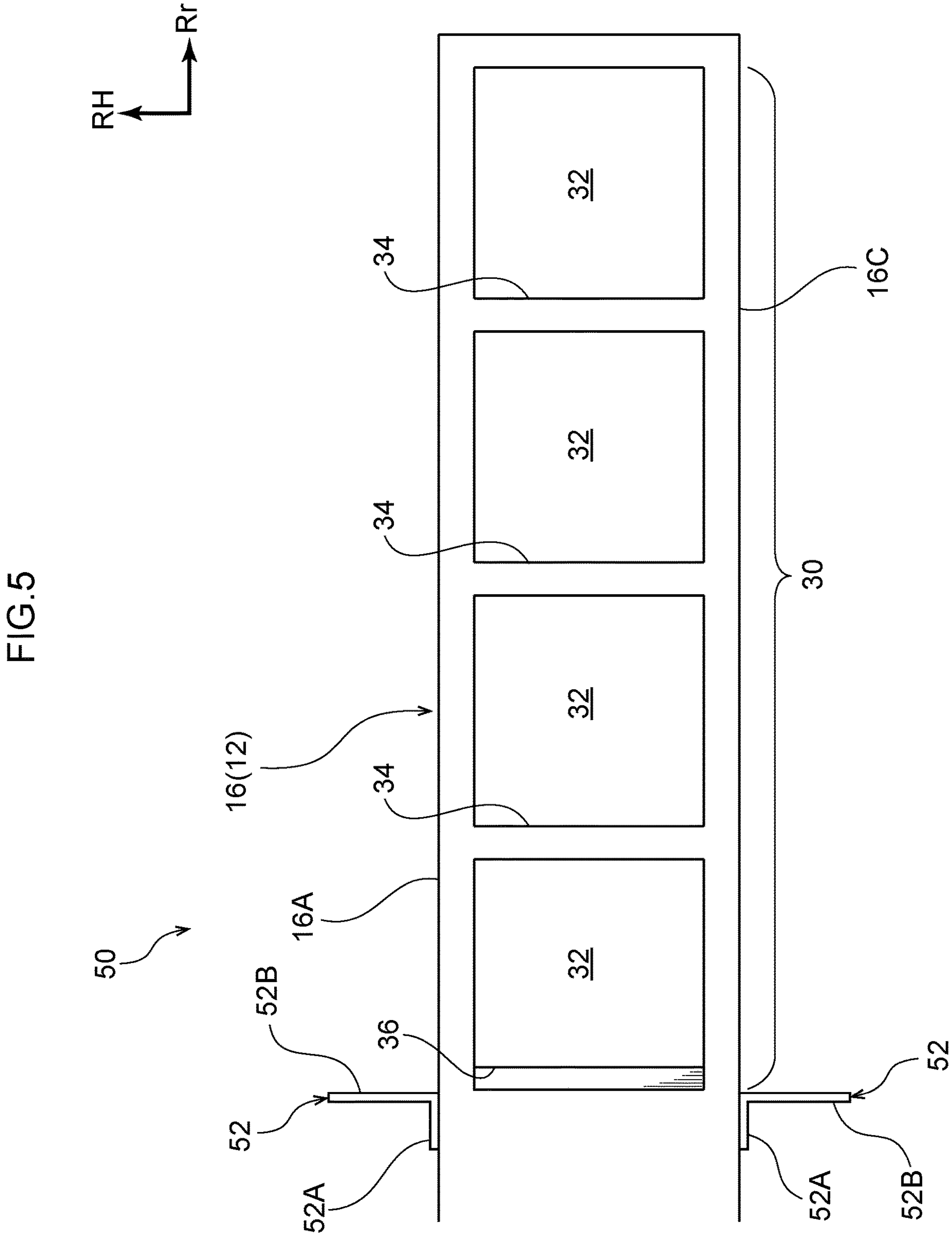
FIG. 5 is an enlarged plan view of a main part illustrating an enlarged view of a main part of a rear side member in a second exemplary embodiment.
Figure 6:
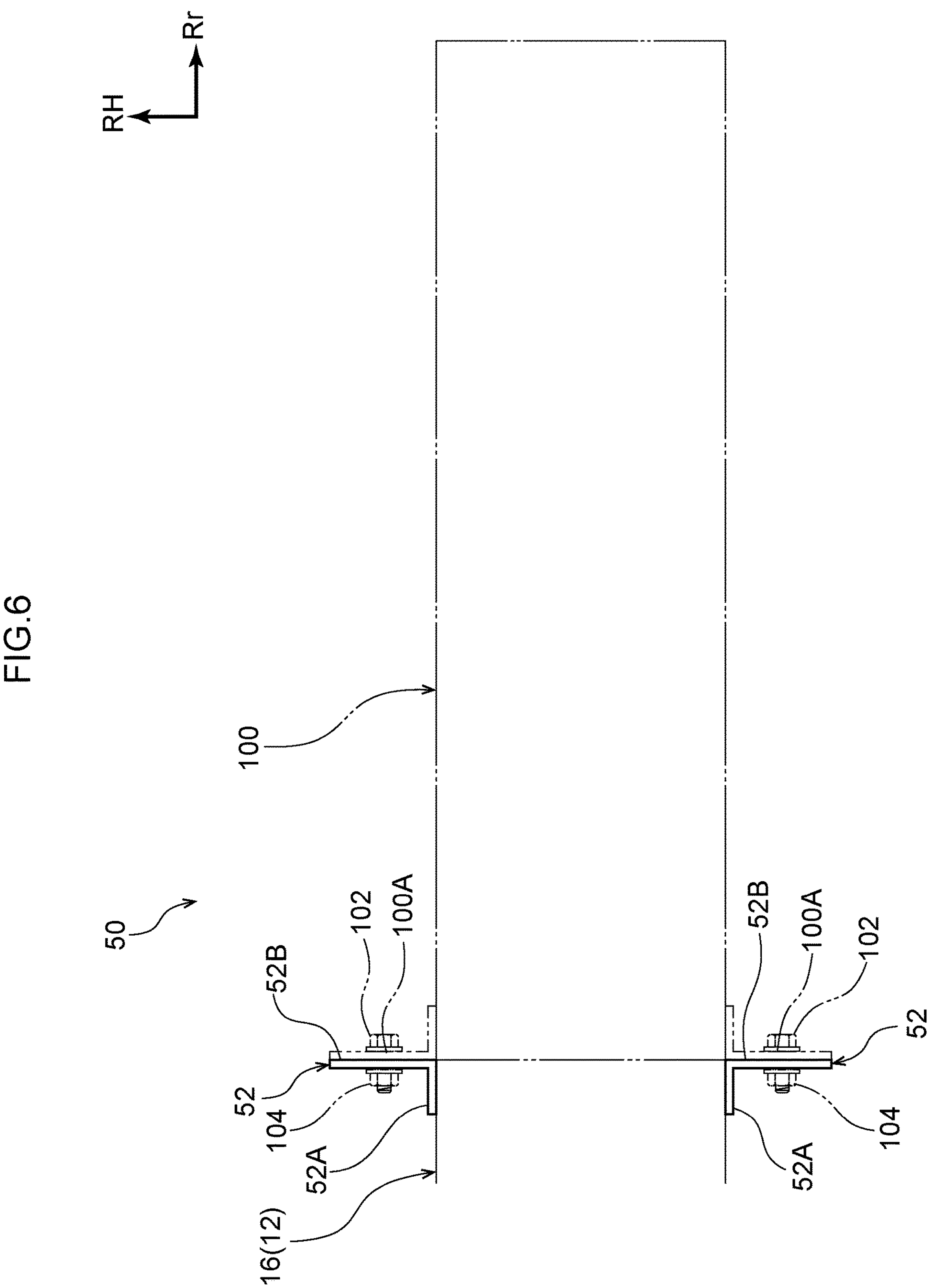
FIG. 6 is a plan view illustrating a state in which the rear side member has been severed from the state of FIG. 5.

Next, explanation follows regarding a vehicle skeleton structure 50 according to a second exemplary embodiment, with reference to FIG. 5 and FIG. 6. Note that the same reference numerals are allocated to configurations similar to those of the first exemplary embodiment, and explanation thereof is omitted as appropriate.

FIG. 5 is an enlarged main part plan view showing an enlarged main part of the rear side member 16 of the present exemplary embodiment. FIG. 6 is a plan view illustrating a state in which the rear side member 16 has been severed from the state of FIG. 5.

As illustrated in FIG. 5, the rear side member 16 of the present exemplary embodiment is configured including an upper wall 16A situated at a vehicle upper side, a lower wall situated at a vehicle lower side, and a left and right pair of side walls 16C connecting the upper wall 16A and the lower wall.

Note that the energy absorbing part 30 is formed in the rear side member 16, and plural concave parts 32 and plural ribs 34 configure the energy absorbing part 30. A cut-out part 36 serving as a severance origin point is formed in a bottom surface of the concave part 32 configuring the energy absorbing part 30 that is closest to the base end. The cut-out part 36 is formed in a shape cut downward from the bottom of the concave part 32 so as to act as a starting point for when at least a part of the rear side member 16 is severed.

A flange part 52 that extends outward in an axial direction from the rear side member 16 is provided in the vicinity of the cut-out part 36 that is the severance origin point. The flange parts 52 are respectively fixed to the side walls 16C of the rear side member 16, and are formed in a substantial L-shape in plan view including a first straight part 52A and a second straight part 52B.

The first straight part 52A of the flange part 52 extends in the vehicle front-rear direction along the side wall 16C of the rear side member 16, and is joined to the side wall 16C. Moreover, the second straight part 52B extends in the vehicle width direction from the rear end part of the first straight part 52A. A non-illustrated attachment hole is formed in the second straight part 52B.

(Mechanism)

Next, explanation follows regarding the mechanism of the present exemplary embodiment.

In the present exemplary embodiment, the rear side member 16 is severed with the cut-out part 36 as a starting point, enabling the rear side member 16 to be easily replaced. In particular, in the present exemplary embodiment, as illustrated in FIG. 6, a replacement rear side member 100 is abutted against the skeleton body 12, and the rear side member 100 can be repaired simply by overlapping and fastening a flange 100A formed at the front end of the rear side member 100 to the flange part 52 fixed to the skeleton body 12.

More specifically, the positions of the flange 100A and the flange part 52 on the side of the skeleton body 12 are aligned in a state in which the replacement rear side member 100 is abutted against the skeleton body 12. Then, a bolt 102 is inserted through the flange 100A and the flange part 52, and screwed into a nut 104 disposed on the opposite side, whereby the replacement rear side member 100 is fixed to the skeleton body 12.

When replacing the rear side member 16 in this manner, the new rear side member 100 can be fixed to the skeleton body 12 simply by joining the flange part 52 and the flange 100A together.

Moreover, in a state in which the flange part 52 and the flange 100A are joined together, the rear side member 100 can be mechanically fixed to the skeleton body 12 by inserting the bolt 102 through an insertion hole. This eliminates the need for work such as welding.

Although explanation has been given regarding the vehicle skeleton structures 10, 50 according to the exemplary embodiments, it will be apparent that various embodiments may be implemented within a range not departing from the gist of the present disclosure. Although the energy absorbing part 30 is configured by the plural concave parts 32 and the ribs 34 in the above exemplary embodiment, there is no limitation thereto. For example, a bead or the like may be formed to configure the energy absorbing part. Further, for example, the energy absorbing part may be configured by forming the leading end of the rear side member 16 in a bellows shape.

Alternatively, a structure not including an energy absorbing part may be adopted. Even in this case, in cases in which the leading end side of the rear side member 16 is deformed owing to a light collision or the like, the rear side member 16 can be replaced by severing the rear side member 16 with the cut-out part 36 as a starting point.

Although explanation has been given regarding a configuration in which the flange parts 52 are provided on both side walls 16C of the rear side member 16 in the second exemplary embodiment described above, there is no limitation thereto. For example, the flange part 52 may be provided on the upper wall 16A and the lower wall 16B of the rear side member 16.

Moreover, although explanation has been given regarding a structure in which the cut-out part 36 is formed as the severance origin point in the above exemplary embodiments, there is no limitation thereto, and a structure provided with another severance origin point may be adopted. For example, a structure in which a through hole is formed as the severance origin point may be used. In particular, as long as a severance origin point that is weak in the shearing direction is formed while ensuring the strength of the side member in the axial direction, the side member can be easily exchanged while maintaining collision safety performance.

Moreover, although explanation has been given regarding a structure in which the vehicle skeleton structures 10, 50 are disposed at a rear part of the vehicle in the above exemplary embodiment, there is no limitation thereto. For example, a similar vehicle skeleton structure may be applied to a front part of the vehicle V. In this case, the skeleton body 12 may adopt an integrally formed structure including a front side member and a front floor.

What is claimed is:

1. A vehicle skeleton structure, comprising:

a skeleton body including a floor part configuring a floor portion of a rear part of a vehicle cabin and side members respectively disposed at both sides, in a vehicle width direction, of the floor part and extending in a vehicle front-rear direction, wherein the floor part and the side members are integrally formed by die casting, wherein each side member is formed with a plurality of concave parts arranged in the vehicle front-rear direction, each of the plurality of concave parts being open in one direction, and wherein each side member has a severance origin point at a bottom of one of the plurality of concave parts, the severance origin point including at least one of a cut-out part or a through hole.

2. The vehicle skeleton structure of claim 1, wherein:

the severance origin point of each side member is formed between the floor part and the one of the plurality of concave parts that is at a base end side of the side member.

3. The vehicle skeleton structure of claim 2, wherein a flange part extending from the side member toward an outer side in an axial direction is provided in a vicinity of the severance origin point.

4. The vehicle skeleton structure of claim 3, wherein an attachment hole is formed at the flange part, the attachment hole being configured to receive a bolt to be inserted therethrough.

* * * * *